(12) United States Patent
Von Novak

(10) Patent No.: US 6,822,852 B2
(45) Date of Patent: Nov. 23, 2004

(54) HANDHELD DEVICES

(75) Inventor: William Von Novak, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 55 days.

(21) Appl. No.: 10/025,120

(22) Filed: Dec. 18, 2001

(65) Prior Publication Data

US 2003/0137802 A1 Jul. 24, 2003

(51) Int. Cl.⁷ .................................................. G06F 1/16
(52) U.S. Cl. ....................... 361/680; 361/683; 400/489; 400/492; 345/169; 455/95
(58) Field of Search ................................. 361/680, 681, 361/683; 400/489, 479, 492, 472, 473, 486; 341/20–22; 345/169, 170; 455/90–95, 566

(56) References Cited

U.S. PATENT DOCUMENTS

| 4,791,408 A | * | 12/1988 | Heusinkveld | ................. 700/84 |
| 5,432,510 A | * | 7/1995 | Matthews | ..................... 341/20 |
| 5,483,235 A | * | 1/1996 | Hanson et al. | ................. 341/20 |
| 5,825,675 A | * | 10/1998 | Want et al. | .................. 708/142 |
| 6,057,788 A | * | 5/2000 | Cummings | .................... 341/22 |
| 6,184,804 B1 | * | 2/2001 | Harrison | ...................... 341/22 |
| 2002/0151283 A1 | * | 10/2002 | Pallakoff | ...................... 455/90 |
| 2002/0163504 A1 | * | 11/2002 | Pallakoff | .................... 345/169 |
| 2003/0083020 A1 | * | 5/2003 | Langford | ..................... 455/90 |

* cited by examiner

Primary Examiner—Lisa Lea-Edmonds
(74) Attorney, Agent, or Firm—Sandip (Micky) Minha; Philip Wadsworth

(57) ABSTRACT

A handheld electronic device comprises a housing around which a plurality of input keys is disposed. The input keys are placed around the housing at locations where fingers will naturally land when the handheld device is being held in an average-sized hand. An interfacing and processing unit is coupled to the plurality of keys and responds to actuation of a selected combination of at least one key by generating data representing a character. In one embodiment the processing unit is arranged to control the display to display an indication of characters that will be input if a combination of one or more input keys is actuated by the user.

19 Claims, 4 Drawing Sheets

HANDHELD DEVICES

BACKGROUND OF THE INVENTION

I. Field of the Invention

The invention relates to improvements in hand held devices. More specifically, the invention relates to improvements in handheld devices to facilitate data input during user interaction with the devices.

II. Description of the Related Art

Handheld devices have increased in popularity with recent advances that have allowed different technologies to be integrated into a single device. So-called personal digital assistants (PDAs) are now available with wireless capabilities and some cell phones come with PDAs built in to the unit. Short message service (SMS) applications are proving popular in GSM-based cellular systems and e-mail and Internet browser applications will be used even more in the future as third generation services become established.

While there are plainly many advantages to high integration, there are also problems with keeping the devices small enough to be truly "handheld" and "portable". Devices supplied with full QWERTY keyboards tend to be large and bulky in order to accommodate keys that sufficiently large for fingertip actuation. Additional space is also required for a display screen and in many cases this has been provided by way of a so-called "clam-shell" design, with the keyboard on one side and the display on the other. Devices supplied with a stylus and touch sensitive screen tend to be less bulky but nevertheless have to be of a size adequate to accommodate a screen with both a data entry area and a display area. There is a trade-off between the size of the data entry area and the display area.

With all the other functions that are now available in handheld devices there is an ongoing need to reduce the space needed on a handheld device for data input during user interaction with the device.

SUMMARY OF THE INVENTION

The invention addresses the above and related problems.

According to one aspect of the invention there is provided a handheld electronic device comprising: a housing; a plurality of input keys disposed around the housing locations where fingers will naturally land when the handheld device is being held in an average-sized hand; and a processing circuit within the housing and coupled to the plurality of keys, the processing circuit being responsive to actuation of a selected combination of at least one key by generating data representing a character.

According to another aspect of the invention there is provided a handheld electronic device comprising: a housing; a plurality of input keys disposed around the housing at locations where fingers will naturally land when the handheld device is being held in an average-sized hand; an interfacing and processing unit coupled to the plurality of keys and responsive to actuation of a selected combination of at least one key by generating data representing a character and processing said data; and a display for displaying a representation of said character represented by the data generated by the processing circuit, and wherein the processor is arranged to control the display to display an indication of characters that will be input if a combination of one or more input keys is actuated by the user.

According to a further aspect of the invention there is provided an apparatus for generating input data, the apparatus comprising: a housing; a display screen mounted to the housing; a plurality of input keys proximate to the display screen and disposed around the housing at positions that facilitate respective actuation by and least some digits on a single hand; a processor, coupled to the input keys and to the display screen, for generating data representing symbols for display on the display screen, which symbols identify combinations of at least one input key corresponding to respective characters from a character set, the processor responding to simultaneous actuation of an identified combination by generating digital, data representing the corresponding character displayed on the display screen.

The invention also provides a data input device comprising: a housing; a plurality of user operable input means disposed about the housing; data generating means for generating display data defining graphics identifying combinations of at least one of said user operable input means and a set of characters respectively associated with said combinations; displaying means mounted to said housing and coupled to said processing means for displaying said graphics defined by said display data; and generating means coupled to the plurality of user operable input means and responsive to actuation of a selected combination of at least one user operable input means by generating data representing the character identified by the displayed graphics.

The invention further provides a method of generating input data using an input device in which a plurality of input keys are disposed around a display screen, the method comprising: generating display data defining graphics identifying combinations of at least one of said input keys and a set of characters respectively associated with said combinations; displaying said graphics defined by said display data; and responding to actuation of a selected combination of at least one user operable input means by generating data representing the character identified by the displayed graphics.

BRIEF DESCRIPTION OF THE DRAWINGS

The above and further features of the invention are set forth with particularity in the appended claims and together with advantages thereof will become clearer from consideration of the following detailed description of an exemplary embodiment of the invention given with reference to the accompanying drawings.

In the drawings.

DETAILED DESCRIPTION OF EMBODIMENTS OF THE INVENTION

Figure 1:
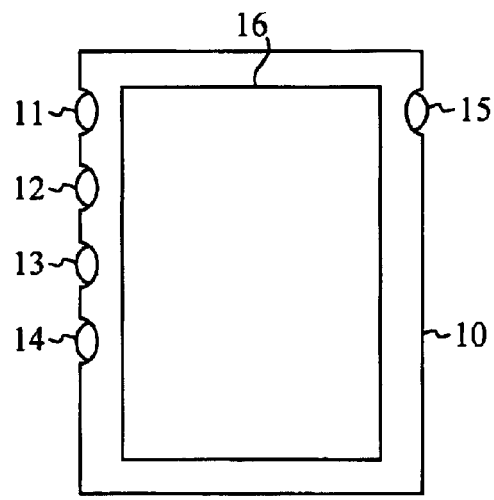
FIG. 1 is a schematic plan view of a handheld device with plural input keys positioned to facilitate single hand data entry.

Turning now to FIG. 1 of the accompanying drawings, there is shown a schematic plan view of a handheld device 10 with plural input keys 11, 12, 13, 14, 15 positioned around the periphery of the device to facilitate single-handed entry of data into the device. Although the device 10 as shown in the drawings has a form resembling that of a so-called personal digital assistant (PDA) it will be appreciated that the invention is not limited in application to such a device. The invention can be applied equally to other handheld devices including cellular phones, pagers, media players, and other devices where user-effected data entry is a necessary or desirable feature. The invention is suited for use in any such device where a user may experience difficulty in entering data by way of a conventional keyboard, or even stylus entry, when mobile.

The device 10 as shown is a right-handed version with the input keys 11 to 14 positioned for actuation by respective fingers of the user's right hand and the key 15 positioned for actuation by the thumb of the same, right hand. A left-handed version would have the position of the keys 11 to 15 reversed with the finger keys 11 to 14 placed on the right side of the device and the thumb key 15 placed on the left side of the device 10. The handheld device may, optionally, also include a display screen 16 for the display of characters or other symbols as they are input by user actuation of combinations of plural keys, as will be described in greater detail herein after. As the cost of display screens falls it may become feasible to provide a screen on each face of the device, thus making the device reversible and thereby doing away with the need to produce separate left- and right-handed versions.

Figure 2:
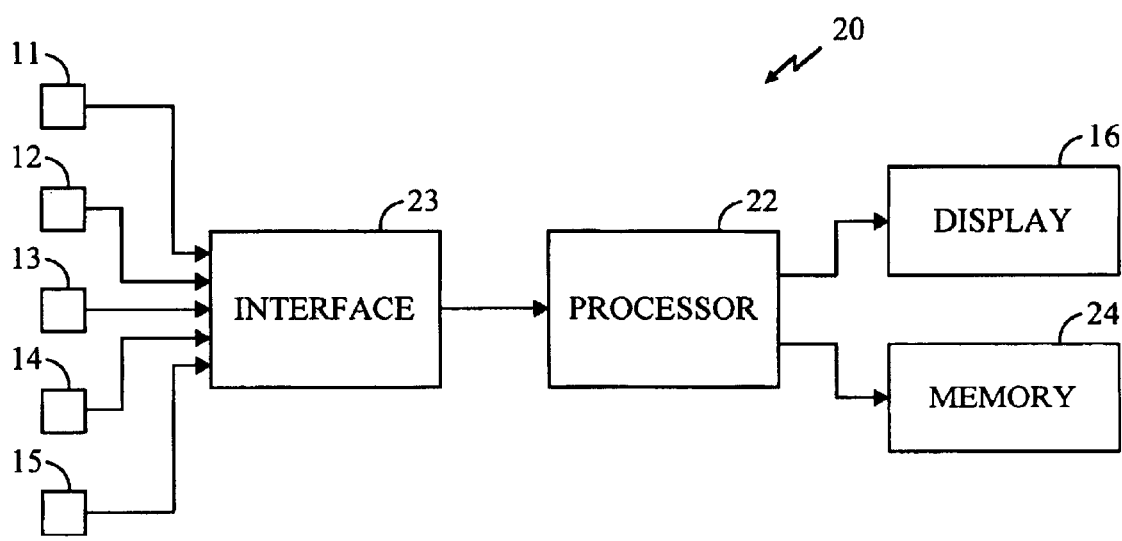
FIG. 2 is a schematic block diagram of circuitry within the handheld device.

FIG. 2 of the accompanying drawings shows in schematic form the circuitry 20 associated with the keys 11 to 15 and the display 16. As shown in FIG. 2, the circuitry comprises the input keys 11 to 15, the display 16, a processor 22 interfaced to the keys 11 to 15 by way of an interface 23, and a memory 24 for storing data input by the user by way of the keys 11 to 15. It will be appreciated that the handheld device will, in fact, contain circuitry that is much more complex than that shown in FIG. 2. Such circuitry is not directly relevant to the invention and has been excluded from this description in the interest of brevity.

In response to user actuation of one or more keys 11 to 15 (as will be described in greater detail herein below) the interface 23 generates data representing a character or other symbol (referred to herein simply as a character) and inputs that data to the processor 22. In one mode of operation, the processor responds to the data by outputting to the display data representing the character for display of the same thereon. In this way the user is able to see that the desired character has been generated by his manipulation of the keys 11 to 15.

Figure 3:
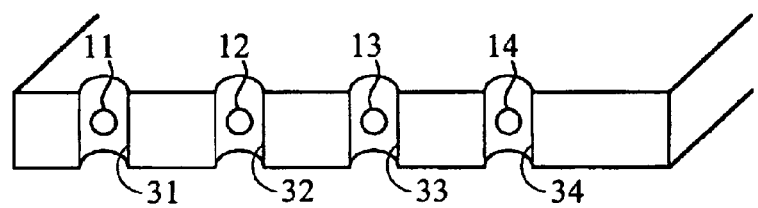
FIG. 3 is a schematic side view showing one arrangement of input keys on the device of FIG. 1.

FIG. 3 of the accompanying drawings shows in more detail than in FIG. 1 one arrangement of the finger keys on the device 10. Each key is provided in the form of a button 11 to 14 in a respective recess 31 to 34 on the body of the device 10. The recesses serve as 'landing areas' for the fingers in that they are placed on the device 10 at locations where the fingers of an average sized hand will naturally land. Thus, the buttons 11 to 14 and recesses 31 to 34 are formed to provide comfortable operation and tactile feedback in a hand of average size.

The interface 23 shown in FIG. 2 is arranged to generate character data in response to the actuation of one or more keys depending on a keymap. The keymap is basically a list of key combinations against output characters and thus may be provided in the form of a look up table (not shown) in or connected with the interface 23. Various different keymaps may be provided. For example, one straightforward way to map the keys is to start with the easiest combinations at the beginning of the alphabet, as shown in Table 1 below.

TABLE 1

Alphabetical Mapping

|   | Key 1 | Key 2 | Key 3 | Key 4 | Thumb Key |
|---|---|---|---|---|---|
| A | X | | | | |
| B | | X | | | |
| C | | | X | | |
| D | | | | X | |
| E | X | | | | X |
| F | | X | | | X |
| G | | | X | | X |
| H | | | | X | X |
| I | X | X | | | |
| J | | X | X | | |
| K | | | X | X | |
| L | X | X | | | X |
| M | | X | X | | X |
| N | | | X | X | X |
| O | X | X | X | | |
| P | | X | X | X | |
| Q | X | X | X | | X |
| R | | X | X | X | X |
| S | X | | X | | |
| T | | X | | X | |
| U | X | | X | | X |
| V | | X | | X | X |
| W | X | X | | X | |
| X | X | | X | X | |
| Y | X | X | | X | X |
| Z | X | | X | X | X |

Note that in Table 1 only 26 of 31 possible key combinations are used. The remaining key combinations can be used for such functions and characters as <enter>, <space>, <return>, etc.

In some cases it may be desirable to map the keys so that the most often used letters are the easiest to enter, i.e. by requiring the fewest number of keys to be pressed. The letter E is the most commonly used in the English language, followed by the letter T. There are plainly advantages to arranging the keys in the order of most frequent use, and an example of one such mapping is given in Table 2 below.

TABLE 2

Most Frequently Used Letters Mapping

|   | Key 1 | Key 2 | Key 3 | Key 4 | Thumb Key |
|---|---|---|---|---|---|
| E | X | | | | |
| E | X | | | | |

TABLE 2-continued

Most Frequently Used Letters Mapping

| | Key 1 | Key 2 | Key 3 | Key 4 | Thumb Key |
|---|---|---|---|---|---|
| T | | X | | | |
| A | | | X | | |
| O | | | | X | |
| I | X | | | | X |
| N | | X | | | X |
| S | | | X | | X |
| R | | | | X | X |
| H | X | X | | | |
| L | | X | X | | |
| D | | | X | X | |
| U | X | X | | | X |
| Y | | X | X | | X |
| M | | | X | X | X |
| C | X | X | X | | |
| G | | X | X | X | |
| F | X | X | X | | X |
| W | | X | X | X | X |
| P | X | | X | | |
| B | | X | | X | |
| V | X | | X | | X |
| K | | X | | X | X |
| X | X | X | | X | |
| J | X | | X | X | |
| Z | X | X | | X | X |
| Q | X | | X | X | X |

Figure 4:
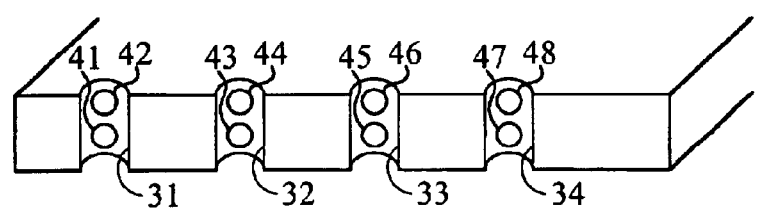
FIG. 4 is a schematic side view showing another arrangement of input keys on the device of FIG. 1.
Figure 5:
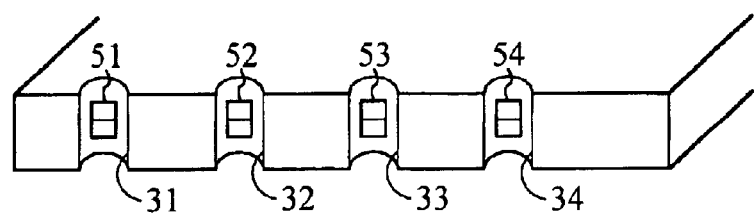
FIG. 5 is a schematic side view showing a further arrangement of input keys on the device of FIG. 1.

FIG. 4 of the accompanying drawings shows another arrangement of the finger keys on the device 10. In this arrangement each key is provided in the form of a pair of buttons 41 and 42, 43 and 44, 45 and 46, 47 and 48 in a respective recess 31 to 34 on the body of the device 10. Similarly, FIG. 5 of the accompanying drawings shows a further arrangement of the finger keys on the device 10. In this arrangement each key is provided in the form of a rocker switch 51, 52, 53 and 54 in a respective recess 31 to 34 on the body of the device 10. Each rocker switch has three states, namely A, off, and B and is biased to return to a central position corresponding to the off state. These states can be used to increase the number of key mappings for a given number of keys, or, as shown in Table 3, to reduce the number of keys provided on the device.

As set out in Table 3, only 4 keys are provided, the thumb key being omitted.

TABLE 3

Frequently Used Letters On Rocker Keys

| | Key 1 | Key 2 | Key 3 | Key 4 |
|---|---|---|---|---|
| E | A | | | |
| T | | A | | |
| A | | | A | |
| O | | | | A |
| I | B | | | |
| N | | B | | |
| S | | | B | |
| R | | | | B |
| H | A | A | | |
| L | | A | A | |
| D | | | A | A |
| U | B | B | | |
| Y | | B | B | |
| M | | | B | B |
| C | A | A | A | |
| G | | A | A | A |
| F | B | B | B | |

TABLE 3-continued

Frequently Used Letters On Rocker Keys

| | Key 1 | Key 2 | Key 3 | Key 4 |
|---|---|---|---|---|
| W | | B | B | B |
| P | A | | A | |
| B | | A | | A |
| V | A | B | | |
| K | A | | B | |
| X | A | | | B |
| J | B | A | | |
| Z | B | | A | |
| Q | B | | | A |

Figure 6:
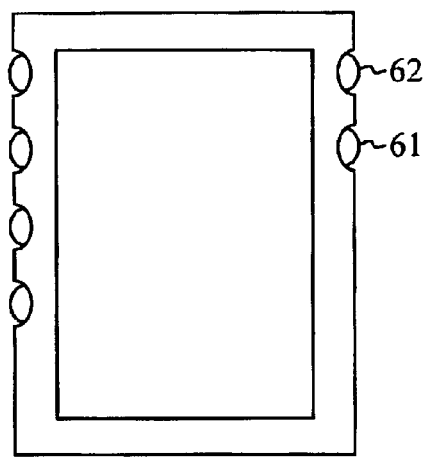
FIG. 6 is a schematic plan view showing one arrangement of input keys on the device of FIG. 1.
Figure 7:
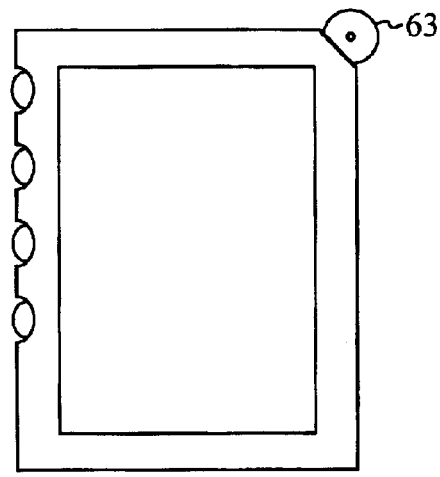
FIG. 7 is a schematic plan view showing another arrangement of input keys on the device of FIG. 1.
Figure 8:
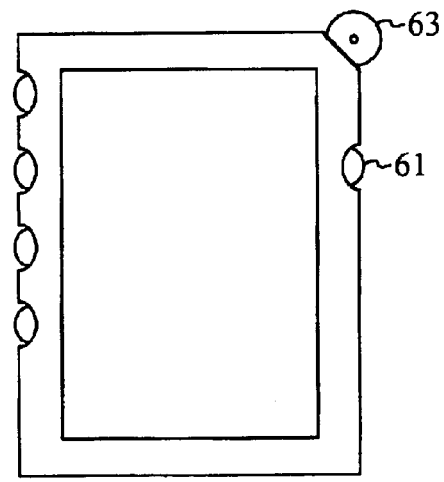
FIG. 8 is a schematic plan view showing a further arrangement of input keys on the device of FIG. 1.

FIGS. 6, 7 and 8 show different arrangements for the thumb key. Instead of the single thumb button 15 shown in FIG. 1, twin buttons 61 and 62 may be provided as shown in FIG. a jog/shuttle wheel 63 may be provided as shown in FIG. 6; or a jog/shuttle wheel 63 may be provided in combination with a button 61 as shown in FIG. 8. Plainly, the provision of such button and wheel combinations can be used to increase the number of key mappings for a given number of keys or to reduce the number of keys provided on the device.

Figure 9:
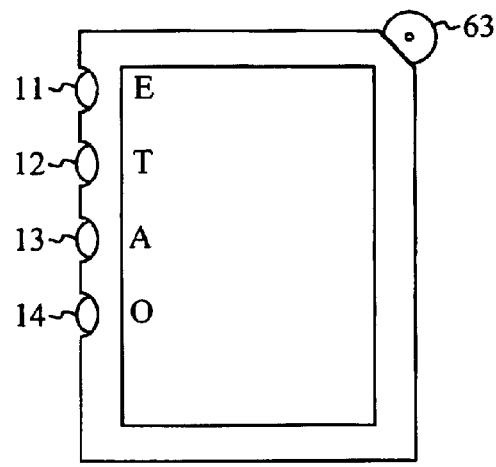
FIG. 9 is a schematic plan view showing a first keymap displayed on a display screen when the device is operating in a soft keyboard mode.

The jog/shuttle wheel can also be used in combination with a display screen to provide a "soft keyboard" function as will now be described with reference to FIGS. 9 and 10 of the accompanying drawings. When the soft keyboard mode is entered (by suitable manipulation of the keys 11 to 14 and the jog/shuttle wheel 63) a keymap is displayed on the screen of the display 16. As shown in FIG. 9, the displayed keymap shows relevant letters next to the keys that must be selected in order to generate that letter. Thus, for example, the letter E is displayed next to key 11, the letter T against key 12, and so on.

Figure 10:
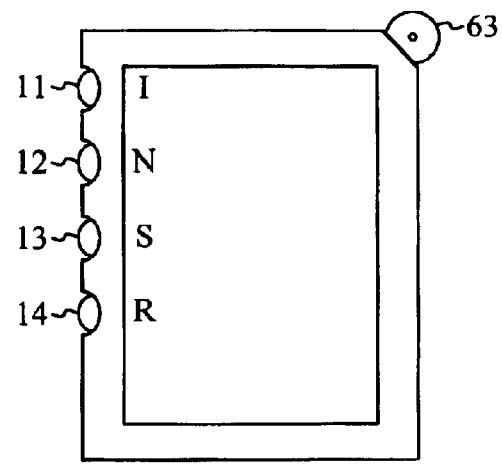
FIG. 10 is a schematic plan view showing a second keymap displayed on a display screen when the device is operating in a soft keyboard mode.

When the user moves the jog/shuttle wheel 53 one notch the display changes to reveal the letters I, N, S and R next to the buttons 11, 12, 13 and 14, as shown in FIG. 10. The user may then decide to enter one of the displayed letters by suitable actuation of the appropriate button, or may chose instead to jog on to the next group of letters, which, if consistent with Table 4 above, would be H, L, D and U. Of course, the alphabetical listing described with reference to Table 1, or an entirely different letter sequence could instead be used, as desired. This arrangement enables a user to use the keys without any prior training. The letters are displayed on the screen and there is therefore no need to remember the keymap for the device.

Figure 11:
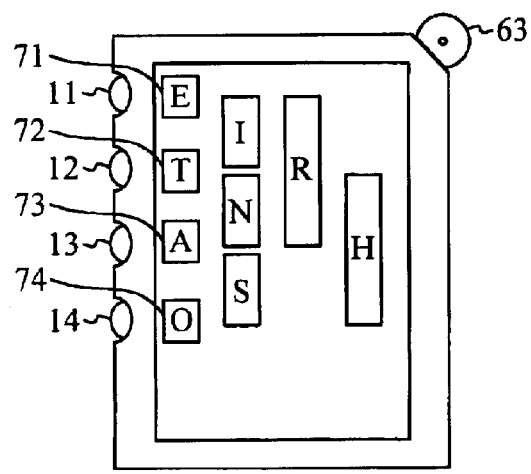
FIG. 11 is a schematic plan view showing a third keymap displayed on a display screen when the device is operating in a soft keyboard mode.
Figure 12:
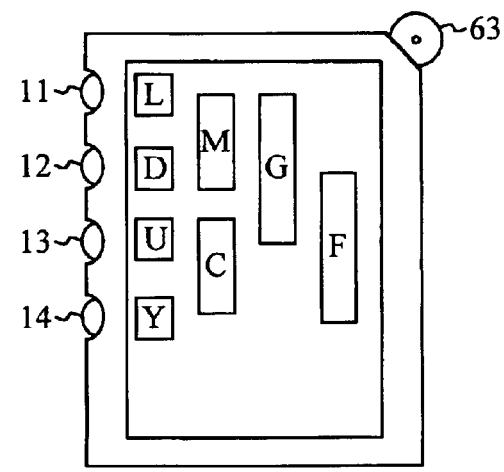
FIG. 12 is a schematic plan view showing a fourth keymap displayed on a display screen when the device is operating in a soft keyboard mode.

While this approach maybe suitable for some users, it does suffer from the disadvantage that a large number of different letter displays may have to be scrolled through in order to find the desired letter. An alternative arrangement, requiring fewer letter displays, is shown in FIGS. 11 and 12 of the accompanying drawings. The display of FIG. 11 includes the letters E, T, A and 0, positioned in column next to the buttons 11 to 14, in a similar manner to that shown in FIG. 9. It also includes the letters I, N and S in another column. Each letter is displayed in a bar or other graphic 71 to 74 that indicates which two buttons need to be pressed for the letter to be input to the device. For example, as shown in FIG. 11, the buttons 11 and 12 need to be pressed together to input the letter I, buttons 12 and 13 give the letter N and buttons 13 and 14 give the letter S.

Rotating the jog/shuttle wheel by one notch will cause the display to change, for example to that shown in FIG. 12.

With this display, the letters L, D, V or Y will be input if buttons 11, 12, 13 or 14 are pressed individually, letter M will be input if buttons 11 and 12 are selected together, letter C if 13 and 14 are selected together, letter G if 11, 12 and 13 are pressed together and letter F if 12, 13 an 14 are pressed together. Other letter/button combinations are, of course, possible.

An example of a keymap of the complete alphabet for the soft keyboard mode is shown in Table 4 below. Only three different jog/shuttle positions and nine different button combinations are required in this keymap to define all letters of the alphabet. Further jog positions could be provided to enable other functions or characters, such as <enter>, <space>, <return>, etc., to be entered.

TABLE 4

Soft Keyboard with Jog/Shuttle Key

| Key | 1 | 2 | 3 | 4 |
|---|---|---|---|---|
| *Jog position 1* | | | | |
| E | X | | | |
| T | | X | | |
| A | | | X | |
| O | | | | X |
| I | X | X | | |
| N | | X | X | |
| S | | | X | X |
| R | X | X | X | |
| H | | X | X | X |
| *Jog position 2* | | | | |
| L | X | | | |
| D | | X | | |
| U | | | X | |
| Y | | | | X |
| M | X | X | | |
| C | | | X | X |
| G | X | X | X | |
| F | | X | X | X |
| W | | X | X | X |
| *Jog position 3* | | | | |
| P | X | | | |
| B | | X | | |
| V | | | X | |
| K | | | | X |
| X | X | X | | |
| J | | X | X | |
| Z | | | X | X |
| Q | X | X | X | |

It will be appreciated that other functions and operations can also be incorporated into the device 10. For example, auto word completion routines, macros, and short-cuts, such as would be found in a word processing application, could be included. The device could also be modified to enable the input of symbols or graphics other than letters. The device is therefore adaptable to the input of binary code, numbers and musical notation, for example.

Having thus described the invention by reference to preferred embodiments it is to be well understood that the embodiments in question are exemplary only and that modifications and variations such as will occur to those possessed of appropriate knowledge and skills may be made without departure from the spirit and scope of the invention as set forth in the appended claims and equivalents thereof.

What is claimed is:

1. A handheld electronic device comprising:

a housing;

a plurality of input keys disposed around the housing locations where fingers will naturally land when the handheld device is being held in an average-sized hand, wherein at least one of the plurality of keys comprises a plurality of buttons to enable more than two different states to be defined by the at least one key; and a processing circuit within the housing and coupled to the plurality of keys, the processing circuit being responsive to actuation of a selected combination of at least one key by generating data representing a character.

2. A handheld device as claimed in claim 1, wherein the processing circuit comprises:

an interface coupled to the plurality of keys for generating said data representing a character; and a processor for processing said data representing a character.

3. A handheld device as claimed in claim 2, wherein the processing circuit further comprises a store coupled to the processor for storing data for use by the processor.

4. A handheld device as claimed in claim 2, wherein the interface comprises a lookup table defining a relationship between the generated data and the combinations of at least one key.

5. A handheld device as claimed in claim 4, wherein the relationship is defined for characters in an alphabetical order.

6. A handheld device as claimed in claim 4, wherein the relationship is defined for characters in a most frequently used letter order.

7. A handheld device as claimed in claim 1, further comprising a display for displaying a representation of said character represented by the data generated by the processing circuit.

8. A handheld device as claimed in claim 1, wherein the plurality of key comprises four keys positioned for actuation by a respective finger of a said average-sized hand, and a fifth key positioned for actuation by the thumb of a said average-sized hand.

9. An apparatus for generating input data, the apparatus comprising:

a housing;

a display screen mounted to the housing;

a plurality of input keys proximate to the display screen and disposed around the housing at positions that facilitate respective actuation by and least some digits on a single hand, wherein at least one of the plurality of keys comprises a jog-shuttle button which enables more than two different states to be defined when at least one other key is actuated simultaneously therewith;

a processor, coupled to the input keys and to the display screen, for generating data representing symbols for display on the display screen, which symbols identify combinations of at least one input key corresponding to respective characters from a character set, the processor responding to simultaneous actuation of an identified combination by generating digital data representing the corresponding character displayed on the display screen.

10. An apparatus as claimed in claim 9, wherein:

processor is arranged to generate data representing symbols identifying subsets of characters from the character set, and to respond to actuation of the jog key by outputting data so as to change the display screen from displaying symbols representing one subset of characters to displaying symbols representing another subset of characters.

11. An apparatus as claimed in claim 10, wherein: the processor is arranged to generate data representing symbols identifying sub-sets of characters which are displayed in an alphabetical order.

12. An apparatus as claimed in claim 10, wherein:
the processor is arranged to generate data representing symbols identifying sub-sets of characters which are displayed in a most frequently used letter order.

13. A method of generating input data using an input device in which a plurality of input keys are disposed around a display screen, the method comprising:
generating display data defining graphics identifying combinations of at least one of said input keys and a set of characters respectively associated with said combinations;
enabling more than two different states to be defined by the at least one key;
displaying said graphics defined by said display data; and
responding to actuation of a selected combination of at least one user operable input means by generating data representing the character identified by the displayed graphics.

14. A method as claimed in claim 13, further comprising responding to manipulation of said input keys by generating data defining graphics for another set of characters respectively associated with said combinations.

15. A method as claimed in claim 13, wherein the display data is generated for characters which are displayed in an alphabetical order.

16. A method as claimed in claim 13, wherein the display data is generated for characters which are displayed in a most frequently used letter order.

17. A method as claimed in claim 13, further comprising:
generating data representing graphics identifying sub-sets of characters from a character set; and responding to manipulation of said input keys by outputting data so as to change the display screen from displaying graphics corresponding to one sub-set of characters to displaying graphics corresponding to another sub-set of characters.

18. A handheld electronic device comprising:

a housing;

a plurality of input keys disposed around the housing locations where fingers will naturally land when the handheld device is being held in an average-sized hand, wherein at least one of the plurality of keys comprises a rocker switch to enable more than two different states to be defined by the at least one key; and a processing circuit within the housing and coupled to the plurality of keys, the processing circuit being responsive to actuation of a selected combination of at least one key by generating data representing a character.

19. A handheld electronic device comprising:

a housing;

a plurity of input keys disposed around the housing locations where fingers will naturally land when the handheld device is being held in an average-sized hand, wherein at least one of the plurity of keys comprise a jog-shuttle button which enables more than two different states to be defined when at least one other key is actuated simultaneously therewith; and a processing circuit within the housing and coupled to the plurality of keys, the processing circuit being responsive to actuation of a selected combination of at least one key by generating data representing a character.

* * * * *